(12) United States Patent
Neubauer et al.

(10) Patent No.: US 7,306,448 B2
(45) Date of Patent: *Dec. 11, 2007

(54) MOBILE IMPRESSION HALF-MOULD FOR A CORRUGATOR FOR MAKING PIPES WITH TRANSVERSE RIBS

(75) Inventors: Gerhard Neubauer, Königsberg (DE); Klaus Kaufmann, Hassfurt (DE)

(73) Assignee: Unicor GmbH Rahn Plastmaschinen, Hassfurt (DE)

( * ) Notice: Subject to any disclaimer, the term of this patent is extended or adjusted under 35 U.S.C. 154(b) by 345 days.

This patent is subject to a terminal disclaimer.

(21) Appl. No.: 10/491,066

(22) PCT Filed: Aug. 10, 2002

(86) PCT No.: PCT/DE02/02949

§ 371 (c)(1),
(2), (4) Date: Mar. 29, 2004

(87) PCT Pub. No.: WO03/031155

PCT Pub. Date: Apr. 17, 2003

(65) Prior Publication Data

US 2004/0241266 A1 Dec. 2, 2004

(30) Foreign Application Priority Data

Sep. 29, 2001 (DE) ................. 101 48 294

(51) Int. Cl.
*B29C 47/90* (2006.01)

(52) U.S. Cl. ............... 425/192 R; 425/233; 425/326.1; 425/336; 425/369; 425/392; 425/396

(58) Field of Classification Search ............ 425/192 R, 425/233, 326.1, 336, 369, 388, 392, 396
See application file for complete search history.

(56) References Cited

U.S. PATENT DOCUMENTS

| 3,380,121 | A | * | 4/1968 | Chittenden et al. .......... 425/528 |
| 3,430,292 | A | * | 3/1969 | Bauman et al. ............. 425/183 |
| 3,776,679 | A | * | 12/1973 | Hegler ....................... 425/532 |
| 3,784,346 | A | | 1/1974 | Maroschak |
| 3,859,025 | A | * | 1/1975 | Maroschak ................. 425/531 |
| 3,864,446 | A | | 2/1975 | Maroschak |
| 4,226,580 | A | * | 10/1980 | Lupke et al. ............... 425/504 |
| 4,492,551 | A | * | 1/1985 | Hegler et al. ............... 425/144 |
| 4,504,206 | A | * | 3/1985 | Lupke et al. ............. 425/326.1 |

(Continued)

FOREIGN PATENT DOCUMENTS

DE 19702547 8/1997

(Continued)

*Primary Examiner*—Robert Davis
*Assistant Examiner*—Joseph Leyson
(74) *Attorney, Agent, or Firm*—Bachman & LaPointe, P.C.

(57) ABSTRACT

A half-mold for a corrugator for making pipes with transverse ribs. The half-mold comprises two sides located spaced apart from each other and a semi-cylindrical base surface linking the two sides. Directly mounted forming elements bent in the shape of a semicircle which define the outer surface of the pipe with transverse ribs are removably fixed on the base surface. The directly mounted forming elements bent in the shape of a semicircle are removably fixed with fixing elements on the half-mold.

5 Claims, 9 Drawing Sheets

U.S. PATENT DOCUMENTS

| | | | | |
|---|---|---|---|---|
| 5,059,109 | A | * 10/1991 | Dickhut et al. | 425/233 |
| 5,582,849 | A | * 12/1996 | Lupke | 425/233 |
| 6,457,965 | B1 | * 10/2002 | Hegler | 425/233 |
| 2006/0062869 | A1 | * 3/2006 | Lupke et al. | 425/325 |

FOREIGN PATENT DOCUMENTS

| | | |
|---|---|---|
| DE | 19702645 | 6/1998 |
| DE | 19702637 | 8/1998 |
| DE | 200 09 030 | * 9/2000 |
| DE | 19914974 | 10/2000 |
| DE | 19916641 | 10/2000 |
| DE | 19946571 | 10/2000 |
| DE | 19922726 | 11/2000 |
| EP | 0435446 | 7/1991 |
| EP | 0544680 | 6/1993 |
| WO | WO 93/25373 | 12/1993 |

* cited by examiner

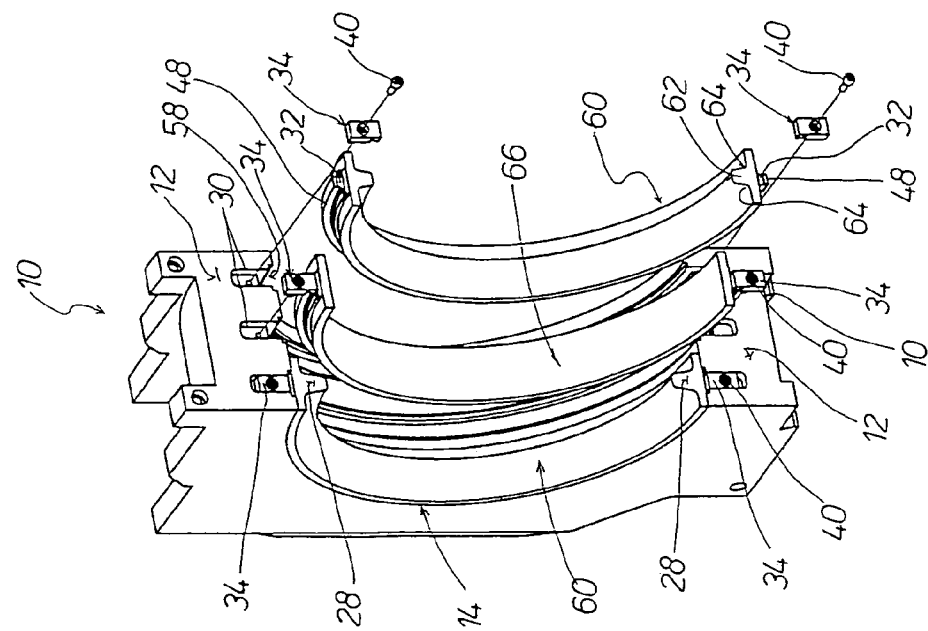
FIG. 10
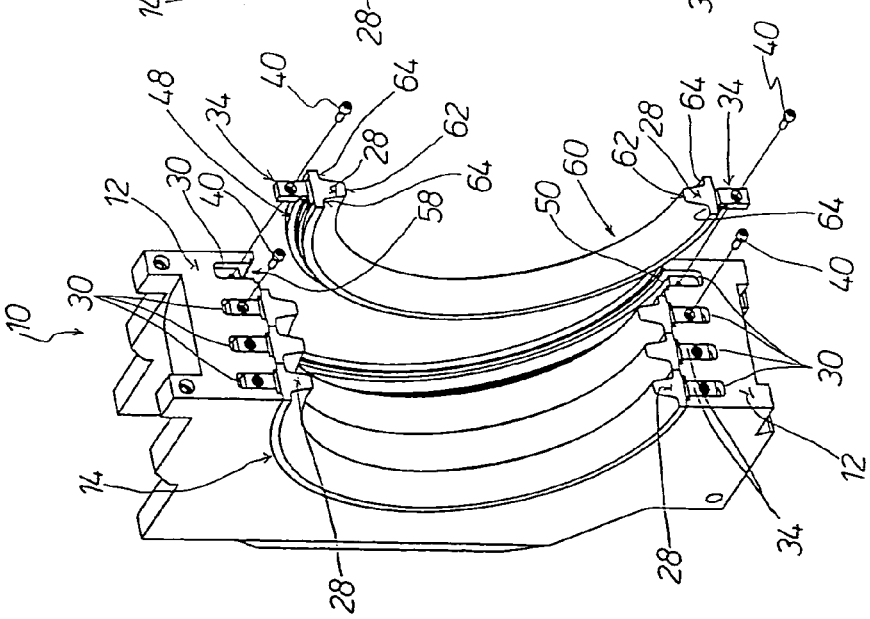
FIG. 8
FIG. 9

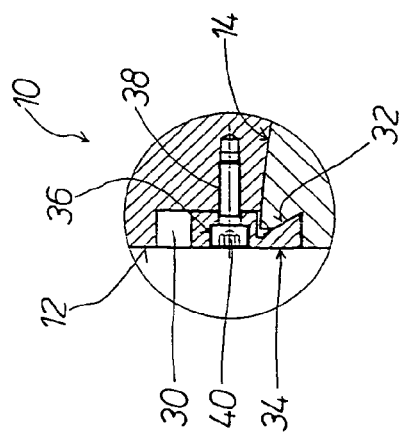
FIG. 17
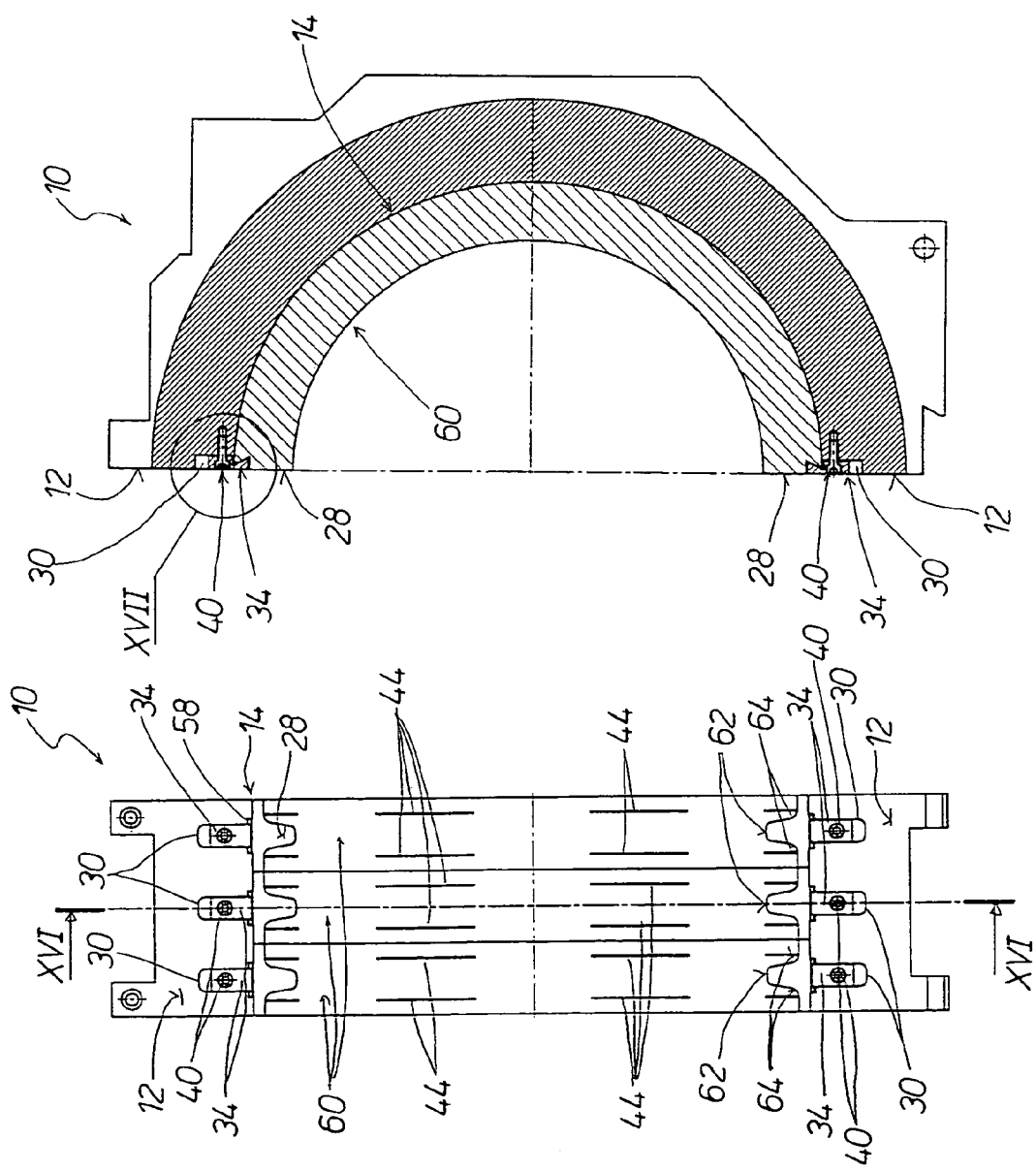
FIG. 16
FIG. 15

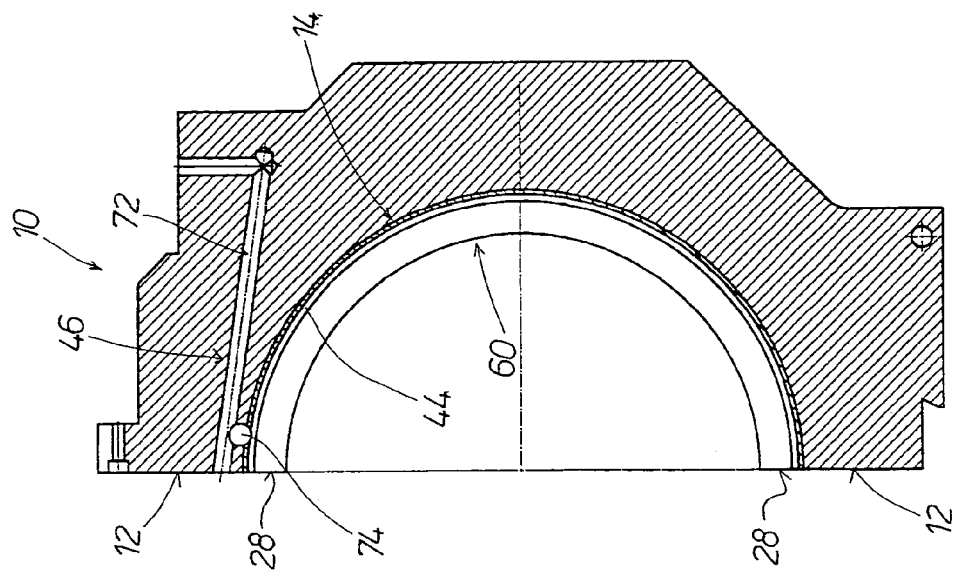
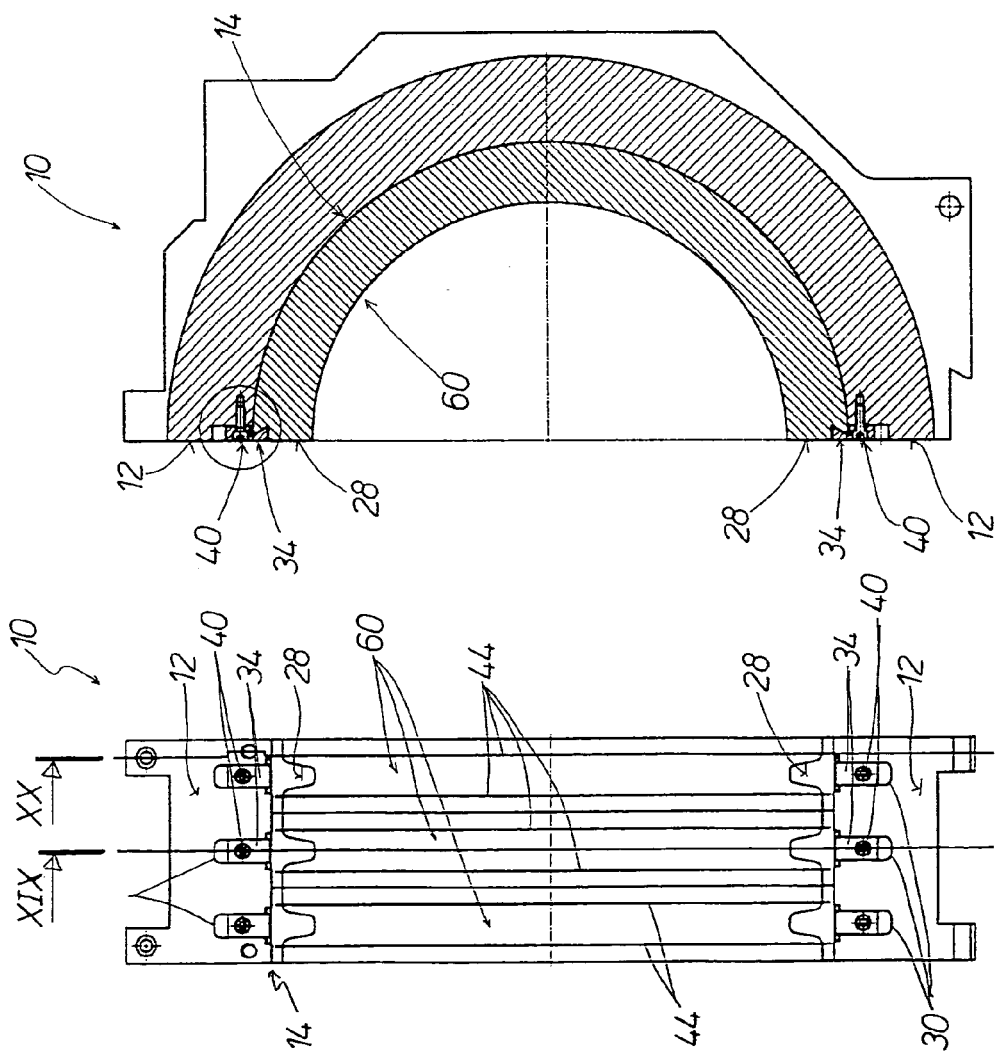

MOBILE IMPRESSION HALF-MOULD FOR A CORRUGATOR FOR MAKING PIPES WITH TRANSVERSE RIBS

BACKGROUND OF THE INVENTION

The invention concerns a mold jaw half for a corrugator for the production of transversely ribbed tubes, as are used for example as installation tubes.

DE 200 09 030 U1 discloses a mold jaw half for a corrugator for the production of transversely ribbed tubes, wherein the mold jaw half has two mutually spaced end faces which are arranged in a common plane, and a semicylindrical base surface connecting the two end faces. The semicylindrical base surface of the mold jaw half is provided with ridges and troughs or channels, which alternate in the axial direction. Releasably mounted to the ridges and in the channels are molding insert elements in the form of a semicircular arc and which each have two diametrally oppositely disposed molding element end faces which are in planar alignment with the end faces of the mold jaw halves if they are arranged precisely correctly. In the case of that known mold jaw half the molding insert elements of a semicircular arcuate configuration are guided movably in their peripheral direction so that they can undesirably project from the respective end face of the mold jaw half.

EP 0 544 680 B1 discloses an apparatus, that is to say a corrugator for the extrusion of tubes of thermoplastic plastic with smooth inner and outer walls which are free from any projecting ribs, the height of which is greater than the thickness of the tube. That apparatus has molding blocks which provide a forwardly moving molding tunnel for molding the tube. The molding tunnel has an upstream end and a downstream end and a cylindrical longitudinal tunnel passage extending between those ends. The molding blocks of that known apparatus are formed by co-operating molding block portions which close at the upstream end of the molding tunnel in order to provide a closed molding block with a molding block bore forming a part of the longitudinal tunnel passage. The molding block portions open at the downstream end of the molding tunnel to release the tube which has been shaped within the longitudinal molding tunnel. The cylindrical bore walls of the molding blocks and thus the wall of the tunnel bore are provided with shallow corrugations for assisting with the transportation movement of the shaped tube. The depth of the corrugations is small in comparison with the thickness of the tube and the width thereof is greater than the depth. The corrugations have alternately shallow grooves and crests, the width of the grooves being at least as great as that of the crests. The grooves and the crests are of a rectangular cross-sectional profile. The corners of the grooves and crests can be rounded off or may involve a curved contour.

A corrugator for the production of tubes, in particular corrugated, that is to say transversely ribbed, tubes, with at least two successions of circulating molding jaws which form a molding passage along a predetermined portion is known from DE 199 14 974 A1. The successions of molding jaws are guided in associated circulatory guide means. The apparatus has at least one change-over molding jaw with a different tube molding configuration, wherein the apparatus has at least one change device along at least one of the circulating guide means.

EP 0 435 446 A2 describes molding jaw halves for a corrugator for the production of transversely ribbed tubes having a plurality of sub-blocks which are fixedly connected together. Each sub-block has an arcuate molding surface which has not more than one corrugation length of ribs and channels. Each sub-block also has two end faces spaced from each other in the longitudinal direction. A vacuum passage is provided at an end face of each sub-block. In the assembled condition of the sub-blocks the vacuum passages form vacuum ducts, leading to mold channels which can be brought into flow communication with an external vacuum source.

U.S. Pat. No. 3,784,346 and U.S. Pat. No. 3,864,446 disclose corrugators or mold jaw halves for corrugators, wherein the respective mold jaw half has two mutually spaced end faces arranged in a common plane and a semicylindrical base surface which connects the two end faces and to which are mounted molding insert elements determining the outside surface of the transversely ribbed tube to be produced. Those molding insert elements involve relatively short elements so that the ribs of the transversely ribbed tube to be produced can be formed with correspondingly short recesses.

DE 199 46 571 C1 describes an apparatus for the production of transversely ribbed tubes. The apparatus has mold jaw halves which move along two paths which are closed in themselves and they form a common mold section and two return sections. Provided at each of the two return sections is a respective turning device at which two mold jaw halves are disposed, by means of a holding and release device. One of those mold jaw halves has a socket contour so that this apparatus can be used to produce transversely ribbed tubes with sockets.

WO 93/25373 discloses a corrugator having mold jaw halves forming a common molding tunnel, wherein the tunnel has a number of mold cavities which are provided in mutually parallel relationship. The mold cavities are connected to a vacuum source, wherein the vacuum can be independently controlled in each mold cavity.

Apparatuses, that is to say corrugators, for the production of transversely ribbed tubes with mold jaw halves which have two mutually spaced end faces arranged in a common plane and a semicylindrical base surface connecting the two end faces are also known for example from DE 197 02 637 C1, DE 197 02 645 C1 and DE 197 02 547 C1.

An apparatus, that is to say a corrugator, for the production of a transversely ribbed tube which can be opened in its longitudinal direction and closed again is described in DE 199 16 641 A1. For that purpose, the transversely ribbed tube produced with that known apparatus has a hook profile and a counterpart hook profile which extend in the longitudinal direction of the corrugated tube. The corrugator of that known apparatus has first and second mold jaw halves, wherein the first mold jaw halves each have a respective radially stepped longitudinal recess which has a first recess to provide the hook profile and a second recess to receive an insert. The insert is provided with a longitudinal channel at its inward side to form the counterpart hook profile.

DE 199 22 726 A1 discloses an apparatus for the production of transversely ribbed tubes. That known apparatus has chill mold halves. The chilled mold halves each have a main body comprising a metal with a higher level of thermal conductivity and of lower specific weight than steel. The respective main body is provided to receive a core, that is to say a mold jaw half. The respective mold jaw half has two mutually spaced end faces arranged in a common plane and a semicylindrical base surface connecting the two end faces. The semicylindrical base surfaces form along a common molding passage a mold recess in which the transversely ribbed tubes are shaped. The mold jaw halves have vacuum passages. Specific respective mold jaw halves are required for the production of transversely ribbed tubes of respectively different configurations.

The object of the invention is to provide a mold jaw half for a corrugator for the production of transversely ribbed tubes, wherein the mold jaw halves are combined or can be combined with molding insert elements which can be easily very reliably positioned and fixed on the respective mold jaw half.

SUMMARY OF THE INVENTION

The foregoing object is achieved by way of the present invention by providing a mold jaw half for a corrugator for the production of transversely ribbed tubes, wherein the mold jaw half has two mutually spaced end faces arranged in a common plane and a semicylindrical base surface which connects the two end faces and to which there are releasably mounted molding insert elements which are in the shape of a semicircular arc and which determine the outside surface of the transversely ribbed tube and which each have two diametrally oppositely disposed molding element end faces which are in planar alignment with the end faces of the mold jaw half, wherein each of the two end faces of the mold jaw half, adjoining the semicylindrical base surface, have a number of first recesses, which corresponds to the number of molding insert elements, and the two molding element end faces of the respective molding insert element, adjoining the two end faces of the mold jaw half, are each provided with a respective second recess, wherein a fixing element extends between the respective first recess and the associated second recess for fixing the respective molding insert element to the mold jaw half.

In general, in mold jaw halves for a corrugator for the production of transversely ribbed tubes, the semicylindrical base surface connecting the two end faces of the mold jaw half is itself directly and immediately formed with transverse ribs and transverse channels which alternate in the axial direction of the mold jaw half, in a fashion corresponding to the outside surface of the transversely ribbed tube to be produced. Mold jaw halves of that configuration are therefore only suitable for the production of transversely ribbed tubes of a given tube diameter and a given lengthwise corrugation configuration. In comparison for example first-mentioned DE 200 09 030 U1 discloses a mold jaw half with molding insert elements in order to be able to produce transversely ribbed tubes of various tube diameters and/or with various longitudinal profile configurations, by a choice of the respectively appropriate molding insert elements in combination with the respectively associated mold jaw half. In the case of that known mold jaw half the molding insert elements however are only secured to prevent unwanted movement in the radial direction, that is to say radially centrally into the mold passage, when the mold jaw half and the associated molding insert elements are temporarily connected together in positively locking relationship for example by dovetail connections or the like. That positively locking connection however means that it is not possible to prevent mobility of the respective molding insert element in its peripheral direction, which means that, along the common molding path section of the corrugator, or in particular along its entry or initial portion, damage can occur to molding insert elements which project from the respective molding jaw half. It is here that the invention provides a remedy, with a molding jaw half for a corrugator for the production of transversely ribbed tubes, wherein the mold jaw half has two mutually spaced end faces arranged in a common plane and a semicylindrical base surface which connects the two end faces and to which there are releasably mounted molding insert elements which are in the shape of a semicircular arc and which determine the outside surface of the transversely ribbed tube and which each have two diametrally oppositely disposed molding element end faces which are in planar alignment with the end faces of the mold jaw half, wherein each of the two end faces of the mold jaw half, adjoining the semicylindrical base surface, have a number of first recesses, which corresponds to the number of molding insert elements, and the two molding element end faces of the respective molding insert element, adjoining the two end faces of the mold jaw half, are each provided with a respective second recess, wherein a fixing element extends between the respective first recess and the associated second recess for fixing the respective molding insert element to the mold jaw half. By means of the respective fixing element, the associated molding insert element is releasably secured to the semicylindrical base surface of the mold jaw half so that the molding insert elements are reliably prevented from undesirably projecting from an end face of the corresponding mold jaw half. The mold jaw half of such a configuration also affords the advantage that individual molding insert elements can be easily replaced by other molding insert elements, without taking up a great deal of time, in order to be able to convert the mold jaw halves of a corrugator for the production of transversely ribbed tubes of a given tube diameter and a given lengthwise corrugation configuration, while involving relatively short conversion times.

In the case of the mold jaw half according to the invention, the semicylindrical base surface of the mold jaw half can have crests and channels which alternate in the axial direction, wherein first molding insert elements having a convex cross-sectional edge contour can be releasably mounted to the crests and second molding insert elements having a concave cross-sectional edge contour can be releasably mounted in the channels. In that case the first and the second cross-sectional edge contours can adjoin each other directly, while another option is that the first and the second cross-sectional edge contours of the first and second molding insert elements are each at a respective given spacing from each other, which spacing is bridged over by a corresponding portion of the respective mold jaw half. While in the first-mentioned case therefore the first and second molding insert elements alone determine the outside surface of the transversely ribbed tube to be produced, the last-described configuration provides that the first and second molding insert elements, jointly with the portions bridging same of the respective mold jaw half, determine the outside surface of the transversely ribbed tube to be produced.

In the case of the mold jaw half according to the invention, another option provides that the semicylindrical base surface of the mold jaw half is simply semicylindrical with mutually axially spaced channels of small depth, wherein a molding insert element is associated with each channel. In that case each molding insert element axially centrally has a convex cross-sectional rib edge contour and adjoining same at both sides a respective half concave cross-sectional channel edge contour. In that way it is possible to produce for example transversely ribbed tubes with transverse ribs and transverse channels which are at least approximately equidistantly spaced from each other, of at least approximately identical axial dimensions. It is however also possible that arranged between molding insert elements which have a convex cross-sectional rib edge contour and adjoining same on both sides thereof a respective half concave cross-sectional rib edge contour is at least one half-annular molding element, wherein the at least one half-annular molding element steplessly adjoins the adjacent molding insert element with a convex cross-sectional rib edge contour. A mold jaw half of such a configuration makes it possible to produce ribbed tubes with transverse channels which are at a large axial spacing from each other, in comparison with the internal channel width.

It is advantageous if each molding insert element is provided at the rear side with a securing member which is fitted into a securing channel, adapted thereto in respect of cross-section, in the semicylindrical base surface of the mold jaw half. It is particularly advantageous in that respect if the securing member and the securing channel adapted thereto in respect of shape are of a simply rectangular configuration, because it is then possible for the respective molding insert element to be easily fitted into the semicylindrical base surface of the mold jaw half from the side, without the need for the molding insert element in the form of a semicircular arc to be introduced in its peripheral direction into the associated securing channel in the mold jaw half. The amount of time and work involved in combining the mold jaw half with molding insert elements is consequently correspondingly slight. It will be appreciated that it is also possible for the securing member of the respective molding insert element and the respective securing channel, which is adapted thereto in respect of shape, in the semicylindrical base surface of the mold jaw half to be provided with undercut configurations, for example in the form of dovetail guides.

Desirably the molding insert elements have vacuum slots and the respective mold jaw half desirably has a vacuum passage system. The vacuum passage system is in flow communication with the vacuum slots. In this case the vacuum passage system can have at least one first passage portion which opens out of one of the end faces of the mold jaw half and which can be connected to a vacuum source and at least one second passage portion which is connected to the first passage portion and which opens out into the vacuum slots.

BRIEF DESCRIPTION OF THE DRAWINGS

Further details, features and advantages will be apparent from the description hereinafter of embodiments illustrated in the drawing of the mold jaw half according to the invention for a corrugator for the production of transversely ribbed tubes. In the drawing:

FIG. 8 shows a perspective view of an embodiment of the mold jaw half with molding insert elements, wherein the semicylindrical base surface of the mold jaw half is of a simple semicircular-cylindrical configuration with axially mutually spaced channels, FIG. 9 shows the mold jaw half of FIG. 8, illustrating a molding insert element spatially spaced from the mold jaw half, that is to say in an exploded view, FIG. 10 shows an exploded perspective view similar in principle to FIG. 9 of an embodiment of the mold jaw half, wherein provided between two axially outer molding insert elements with a rib edge contour is a molding insert element which is in the form of a semi-annular molding element, without a rib contour, FIG. 15 shows a front view of a mold jaw half similar to those shown in FIGS. 8 through 10, the molding insert element having vacuum slots, FIG. 16 showing a section along line XVI-XVI in FIG. 15 through the mold jaw half with its molding insert elements and the fixing elements fixing the molding insert elements in the mold jaw half, FIG. 17 shows the detail XVII of FIG. 16 on a larger scale, FIG. 18 is a view similar to FIG. 15 of an embodiment of the mold jaw half, wherein however the vacuum slots extend along the entire peripheral extent of the molding insert elements, FIG. 19 is a section taken along line XIX-XIX in FIG. 18, and FIG. 20 is a section taken along line XX-XX in FIG. 18.

DETAILED DESCRIPTION

Figure 1:
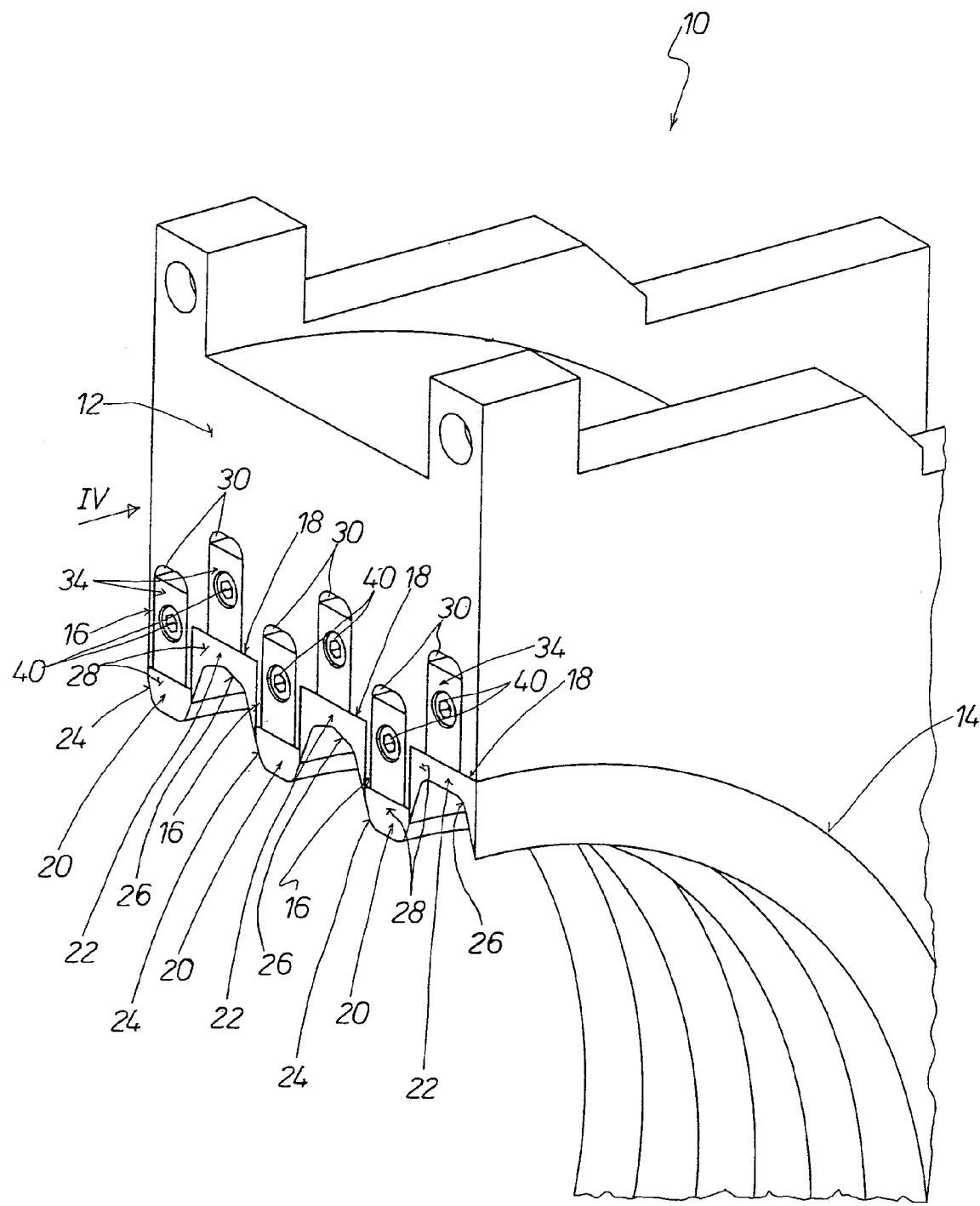
FIG. 1 is a perspective view of a portion of a first embodiment of the mold jaw half for the production of a transversely ribbed tube.

FIG. 1 is a perspective view showing a portion of a configuration of the mold jaw half 10 for a corrugator for the production of transversely ribbed tubes. The mold jaw half 10 has two mutually spaced end faces 12 which are provided in a common plane. Only one of those end faces 12 is shown in FIG. 1. The mold jaw half 10 also has a semicylindrical base surface 14 which extends between the two end faces 12, that is to say it connects them together. The semicylindrical base surface 14 of the mold jaw half 10 has crests 16 and channels 18 which alternate in the axial direction of the mold jaw half 10. Molding insert elements 20 are fitted to the crests 16. Second molding insert elements 22 are mounted in the channels 18. The molding insert elements 20 have a convex cross-sectional edge contour 24 and the molding insert elements 22 have a concave cross-sectional edge contour 26. The crests 16 and the channels 18 of the semicylindrical base surface 14 of the mold jaw half 10 and the convex cross-sectional edge contour 24 of the molding insert elements 20 and the concave cross-sectional edge contour 26 of the molding insert elements 22 are of such configurations that the cross-sectional edge contours 24 and 26 directly and immediately steplessly adjoin each other. The edge contours 24 and 26 of the molding insert elements 20 and 22 determine the outside surface of the transversely ribbed tube to be produced.

Figure 2:
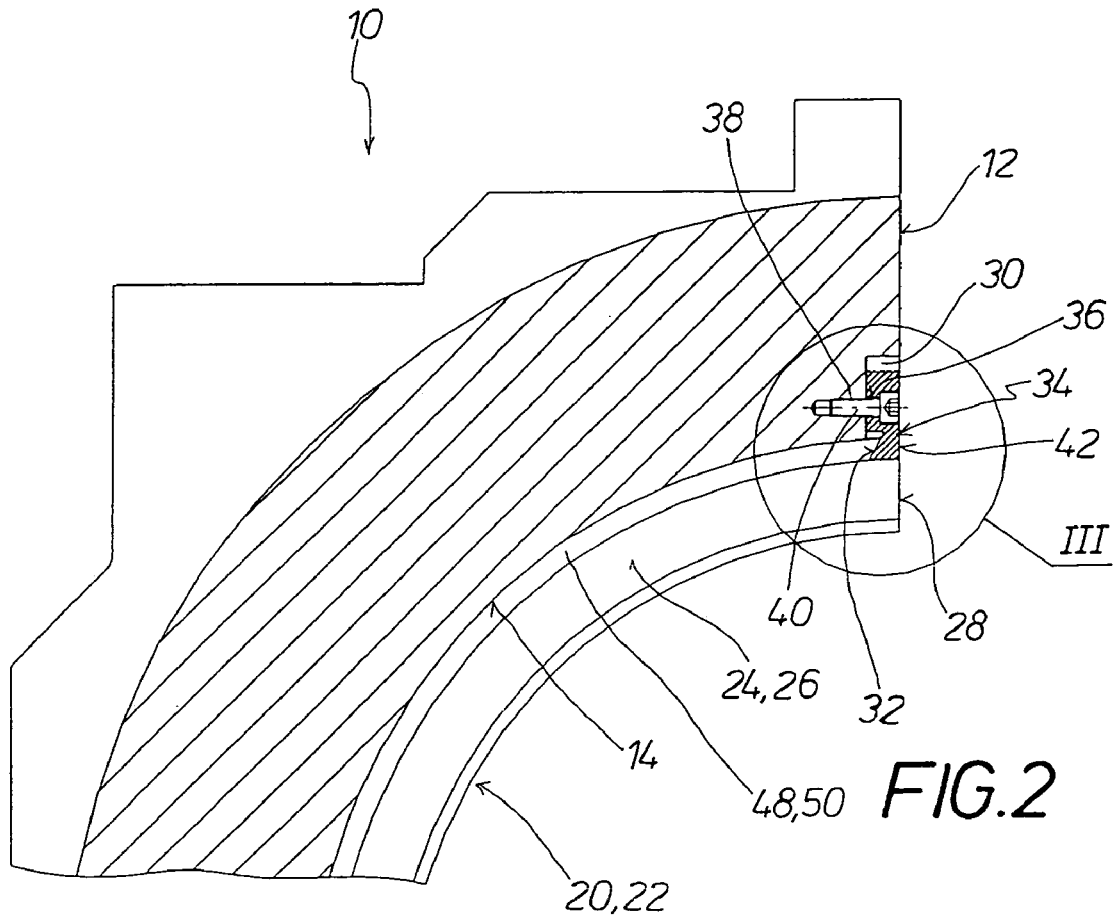
FIG. 2 is a cross-section through the portion of the mold jaw half shown in FIG. 1.
Figure 3:
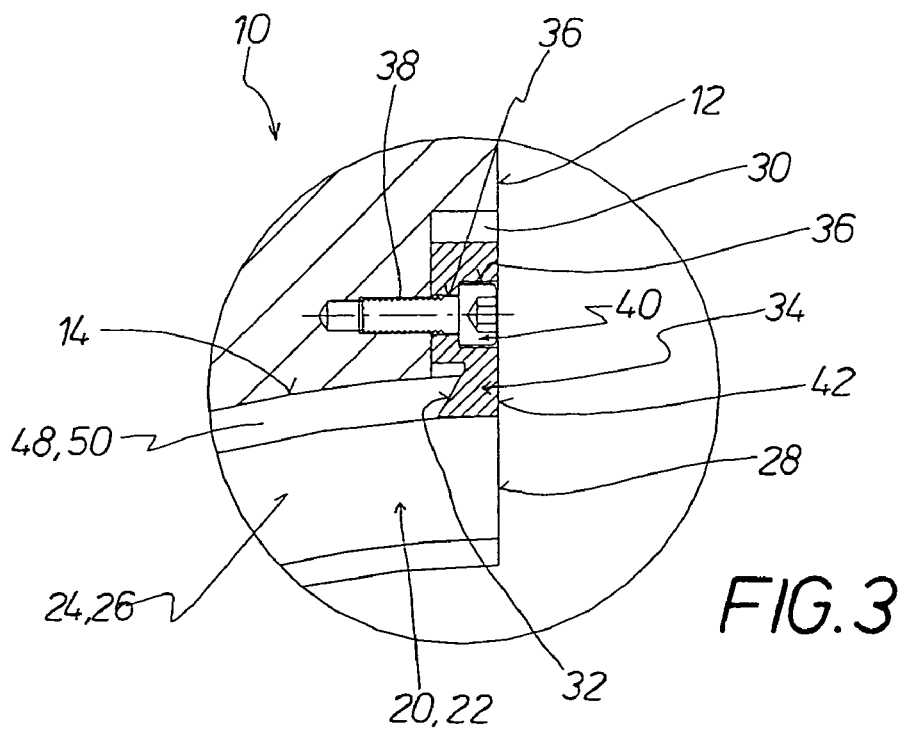
FIG. 3 shows the detail III in FIG. 2 on a larger scale.

As can also be seen in particular from FIGS. 2 and 3 the molding insert elements 20 and 22 have end faces 28 which are in diametrally opposite relationship and which are disposed in a common plane. The end faces 28 of the molding insert elements 20 and 22 are in planar alignment with the end faces 12 of the mold jaw half 10, that is to say they define a common plane with the end faces 12.

Each of the two end faces 12 of the mold jaw half 10 is provided with a number of first recesses 30 which adjoin the semicylindrical base surface 14 of the mold jaw half 10, the number of first recesses 30 corresponding to the number of molding insert elements 20 and 22. The two end faces 28 of the respective molding insert element 20, 22 have second recesses 32 provided in adjoining relationship with the corresponding end face 12 of the mold jaw half 10, so that the first and the second recesses 30 and 32 respectively form a common recess which serves to receive a fixing element 34. The fixing elements 34 are for example in the form of a small plate member with a stepped hole 36 therethrough. A screw 40 is screwed through the respective through hole 36 into an associated blind screwthreaded hole 38 in the mold jaw half 10 in order to fix the respective fixing element 34 in the first recess 30 and to fixedly connect the associated molding insert element 20 or 22 to the mold jaw half 10 in such a way that the end faces 12 of the mold jaw half 10 and the end faces 28 of the molding insert elements 20, 22 are in mutually planar alignment, as can be clearly seen from FIGS. 2 and 3. The fixing elements 34 are of such dimensions that the face 42 thereof is also in planar alignment with the end faces 12 and 28.

Figure 4:
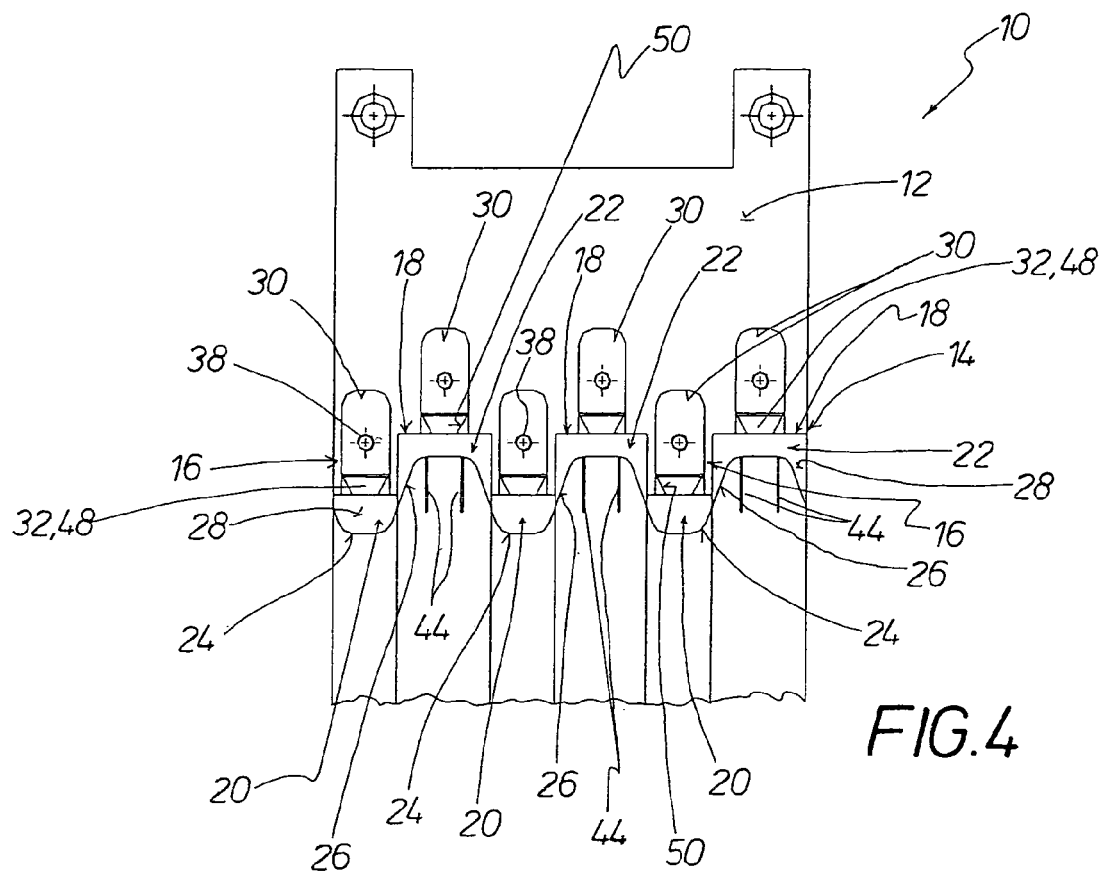
FIG. 4 shows a front view of the mold jaw half of FIG. 1 viewing in the direction of the arrow IV, without the fixing elements immovably fixing the molding insert elements to the mold jaw half.

FIG. 4 shows a portion of a mold jaw half 10 having a semicylindrical base surface 14 which—as in the structure shown in FIG. 1—has crests 16 and channels 18, wherein provided on the crests 16 are molding insert elements 20 and provided in the channels 18 are molding insert elements 22—corresponding to the configuration shown in FIG. 1—, the cross-sectional edge contours 24 and 26 of which directly and immediately adjoin each other. FIG. 4 shows in particular vacuum slots 44 which are provided in the molding insert elements 22 50 that, in the production of the respective transversely ribbed tube, the extruded tube material is caused to bear closely against the concave cross-sectional edge contour 26 of the molding insert elements 22. In that case, as will be appreciated, the tube material automatically bears closely against the convex cross-sectional edge contour 24 of the molding insert elements 20. The vacuum slots 44 are in flow communication with a vacuum passage system (not shown in FIG. 4) of the associated mold jaw half 10. That vacuum passage system is further described hereinafter with reference to FIG. 20 where it is identified by reference numeral 46.

FIG. 4 also shows that the molding insert elements 20 and 22 are each provided at their rear side, that is to say at their side which is radially remote from the cross-sectional edge contour 24, 26, with a securing member 48. In this embodiment the securing members 48 have a trapezoidal cross-section in the manner of a dovetail guide. The semicylindrical base surface 14 of the mold jaw half 10, which has crests 16 and channels 18, is provided with securing channels 50 which correspond in cross-section to the securing members 48.

The same details are identified in each of FIGS. 1 through 3 and in FIG. 4 by the same reference numerals.

Figure 5:
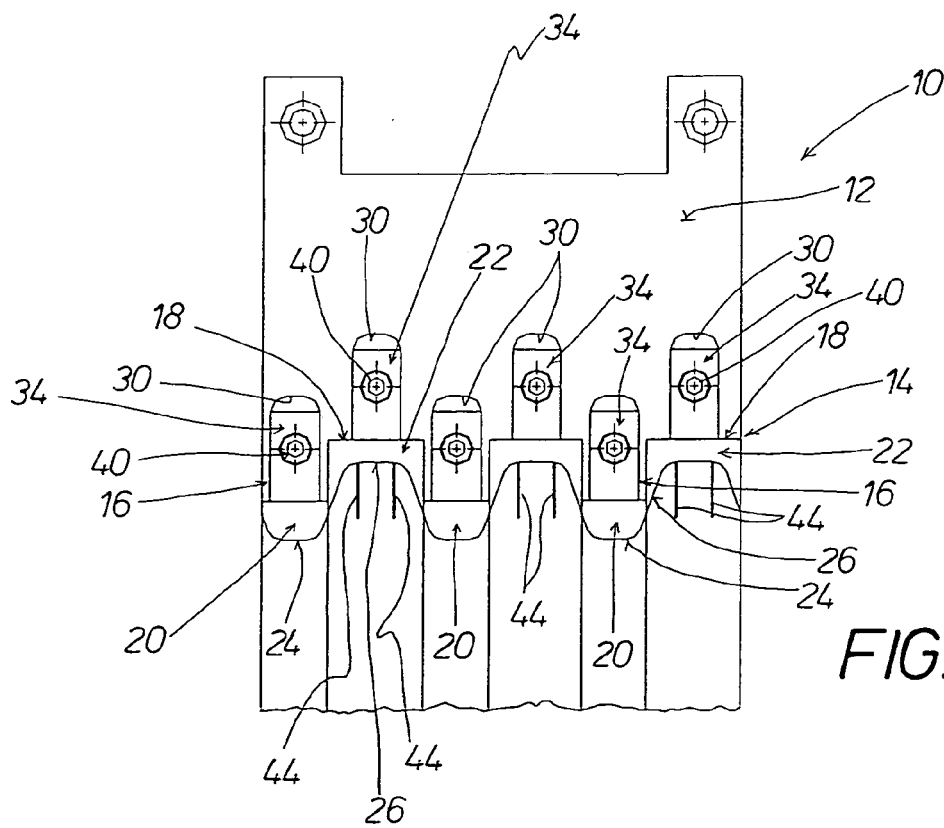
FIG. 5 shows a front view corresponding to FIG. 4 with the fixing elements for fixing the molding insert elements to the mold jaw half.

FIG. 5 only differs from FIG. 4 in that the molding insert elements 20 and 22 are immovably secured, that is to say fixed, to the semicylindrical base surface 14 of the mold jaw half 10, by means of the fixing elements 34. Identical features are identified in FIG. 5 by the same reference numerals as in FIGS. 1 through 4 so that there is no need for all those features to be described in detail once again with reference to FIG. 5.

Figure 6:
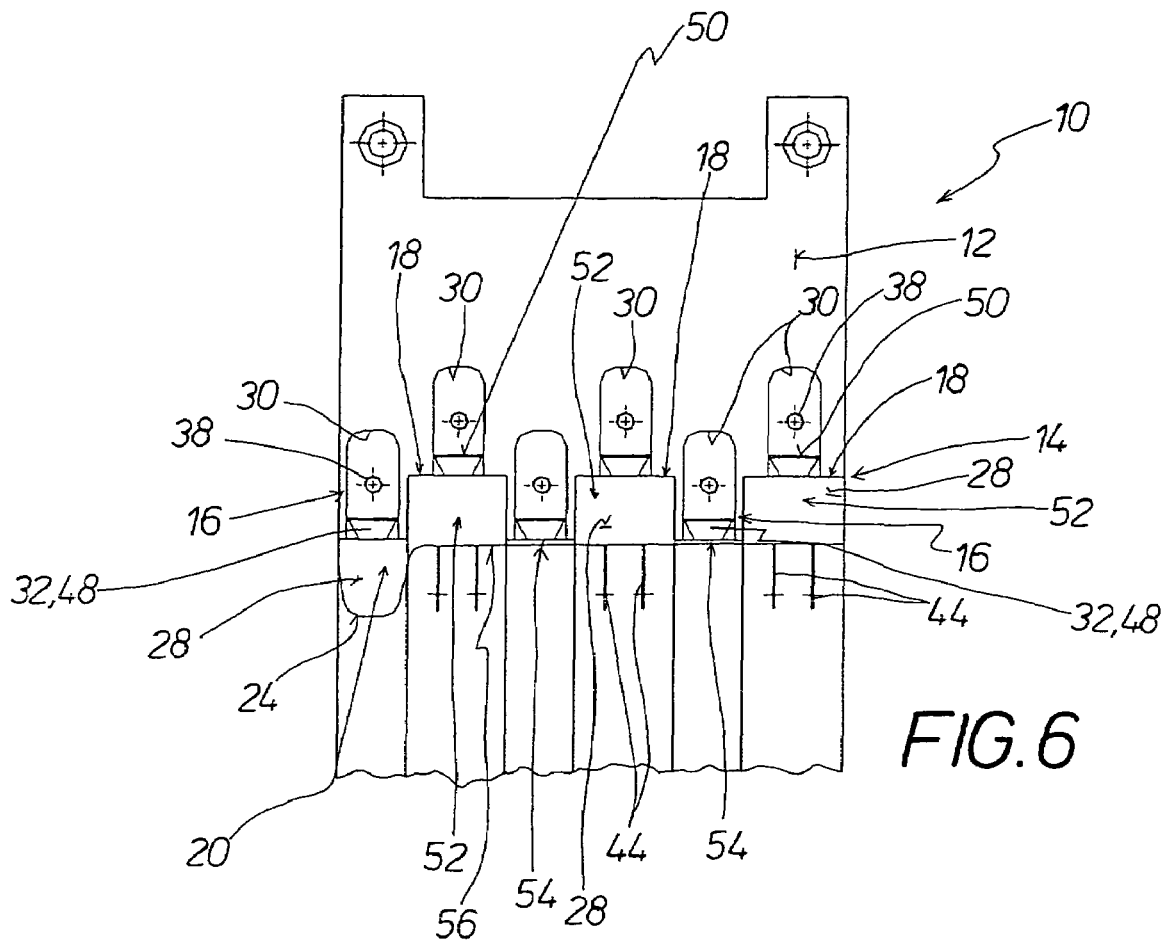
FIG. 6 is a front view similar in principle to FIG. 4 of another embodiment of the mold jaw half with molding insert elements for producing a transversely ribbed tube with transverse channels which are of a small axial internal width in comparison with the axial spacing of adjacent transverse channels.
Figure 7:
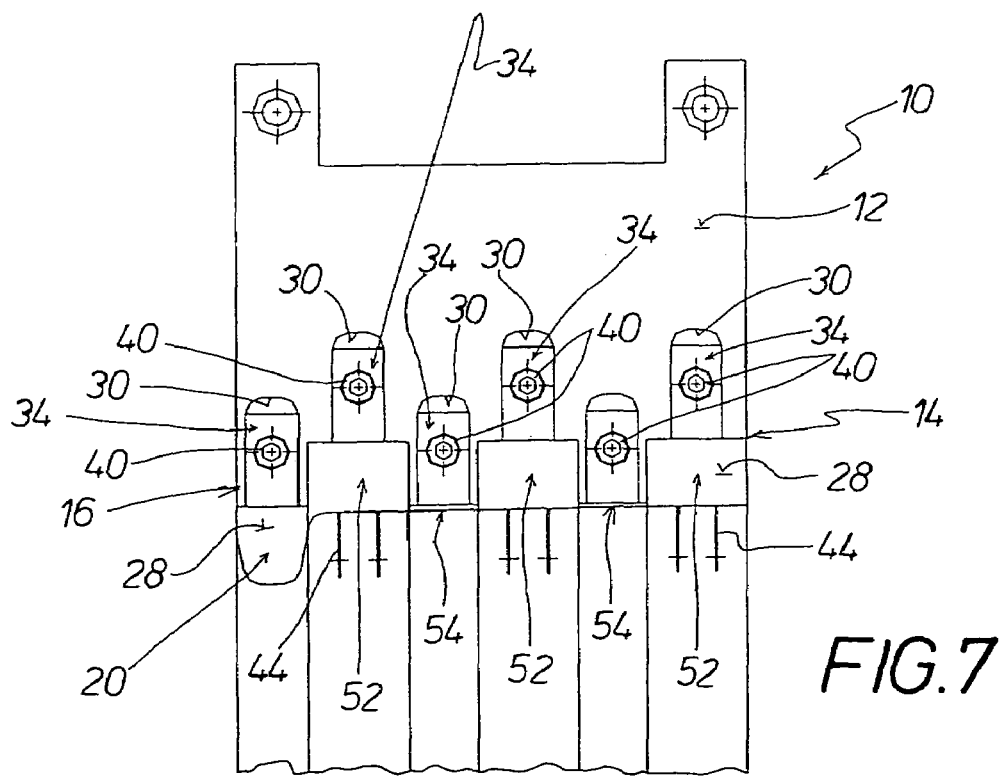
FIG. 7 shows the mold jaw half of FIG. 6, similarly to the mold jaw half of FIG. 5, also showing the fixing elements for fixing the molding insert elements to the mold jaw half.

FIGS. 6 and 7 show an embodiment of the mold jaw half 10 without fixing elements (see FIG. 6) and with fixing elements 34 (see FIG. 7), wherein the semicylindrical base surface 14 of the mold jaw half 10—like the structures shown in FIGS. 1 through 5—has axially alternate crests 16 and channels 18. In the embodiment shown in FIGS. 6 and 7 however a molding insert element 20 with a convex cross-sectional edge contour 28 is only mounted to one crest 16 while the remaining crests 16 and channels 18 are combined with molding insert elements 52 and 54 which provide for a smooth surface 56 for the mold jaw half 10 and thus a correspondingly smooth outside surface for the transversely ribbed tube to be produced. In other respects the design of the mold jaw half 10 shown in FIGS. 6 and 7 is similar to that shown in FIGS. 4 and 5 so that there is no need for all features which are identified in FIGS. 6 and 7 by the same reference numerals as in FIGS. 4 and 5 to be described once again in detail in connection with FIGS. 6 and 7.

FIGS. 4 and 5 and FIGS. 6 and 7 are intended to serve in particular to make it clear that the mold jaw half 10 can be combined as desired with any molding insert elements 20, 22, 52, 54 in order to produce transversely ribbed tubes having the respectively desired outside surface. The respective molding insert elements 20, 22, 52, 54 can also be replaced as desired by other corresponding molding elements. For that purpose, it is only necessary to release the corresponding fixing elements 34, replace the molding elements and fix the new molding elements in place again on the mold jaw half 10 by means of the fixing elements 34.

FIGS. 8 and 9 show a perspective view of a mold jaw half 10 in which the semicylindrical base surface 14 does not have crests and channels but is of a simply semicircular-cylindrical configuration with axially mutually spaced channels 58, with a molding insert element 60 being associated with each channel 58. The respective molding insert element 60 axially centrally has a convex cross-sectional edge contour 62, which is adjoined at each of its two sides by a respective half concave cross-sectional edge contour 64. In the assembled condition the molding insert elements 60 adjoin each other closely and steplessly in order to form an inside surface corresponding to the outside surface of the transversely ribbed tube to be produced. The molding insert elements 60 are again fixed in the mold jaw half 10 by means of fixing elements 34 or by means of screws 40 for securing the fixing elements 34 in the recesses 30 in the end faces 12 of the mold jaw half 10.

This design configuration also provides that each molding insert element 60 is provided on its rear side with a securing member 48 which extends in the peripheral direction along the associated molding insert element 60 and which is provided adjoining the respective end face 28 with a second recess 32 (see for example FIGS. 2 and 3).

FIG. 10 is a perspective view of a mold jaw half 10 which differs from the embodiment shown in FIGS. 8 and 9 in particular in that a semi-annular molding element 66 is provided between molding insert elements 60 of which that shown at the right is spaced from the mold jaw half 10, that is to say as an exploded view. While mold jaw halves 10 as shown in FIGS. 8 and 9, in a per se known corrugator, are used to produce transversely ribbed tubes with corrugation troughs and corrugation crests in which the corrugation crests and the corrugation troughs are of at least approximately equal dimensions in the axial direction, mold jaw halves 10 as shown in FIG. 10 produce a transversely ribbed tube in which the corrugation crests are long axially in comparison with the axial length of the corrugation troughs.

Identical features are identified in FIGS. 8, 9 and 10 by the same references as in FIGS. 1 through 7 so that there is no need for all those features to be described in detail once again with reference to FIGS. 8 through 10.

Figure 11:
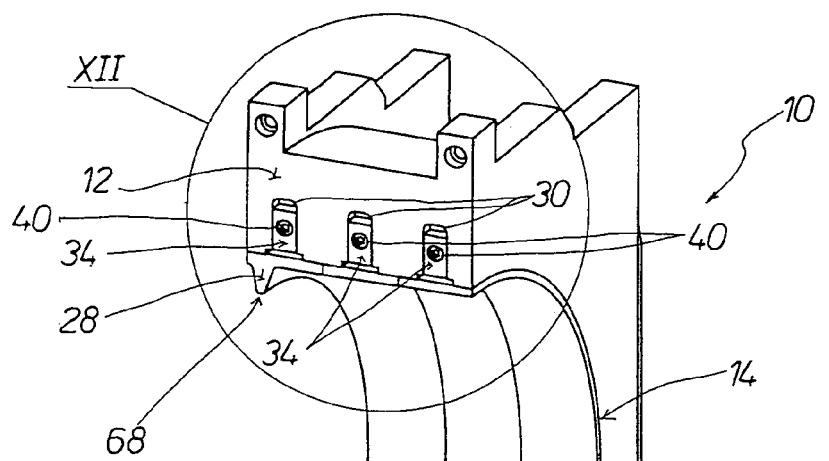
FIG. 11 shows a mold jaw half for the production of a transversely ribbed tube—similar to the mold jaw half of which part is shown in FIG. 7, wherein however the semicylindrical base surface of the mold jaw half—as in the structures shown in FIGS. 8 through 10—is of a simple semicircular-cylindrical configuration with axially mutually spaced channels.
Figure 11:
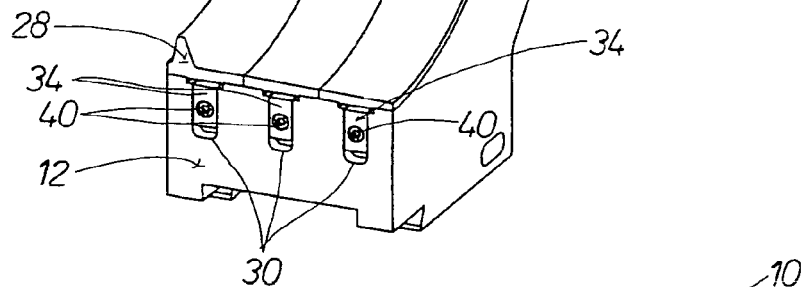
Figure 12:
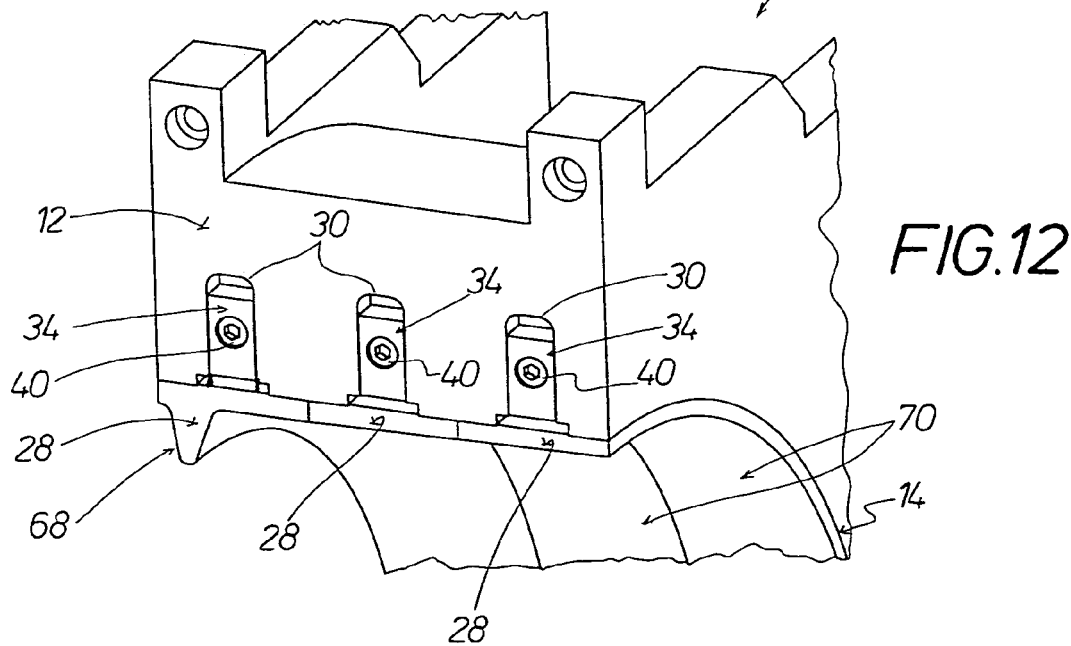
FIG. 12 shows the detail of FIG. 11 on a larger scale.

FIGS. 11 and 12 are intended to show a design configuration for the mold jaw half 10, wherein the semicylindrical base surface 14 between the two end faces 12 is of a semicircular-cylindrical configuration with axially mutually spaced channels 58—similarly to the structures shown in FIGS. 8, 9 and 10. Fixed to the semicylindrical base surface 14 by means of fixing elements 34 or screws 40 are molding insert elements 68, 70 which are suitable and intended for the production of a transversely ribbed tube—similarly to the structure shown in FIG. 7.

Figure 13:
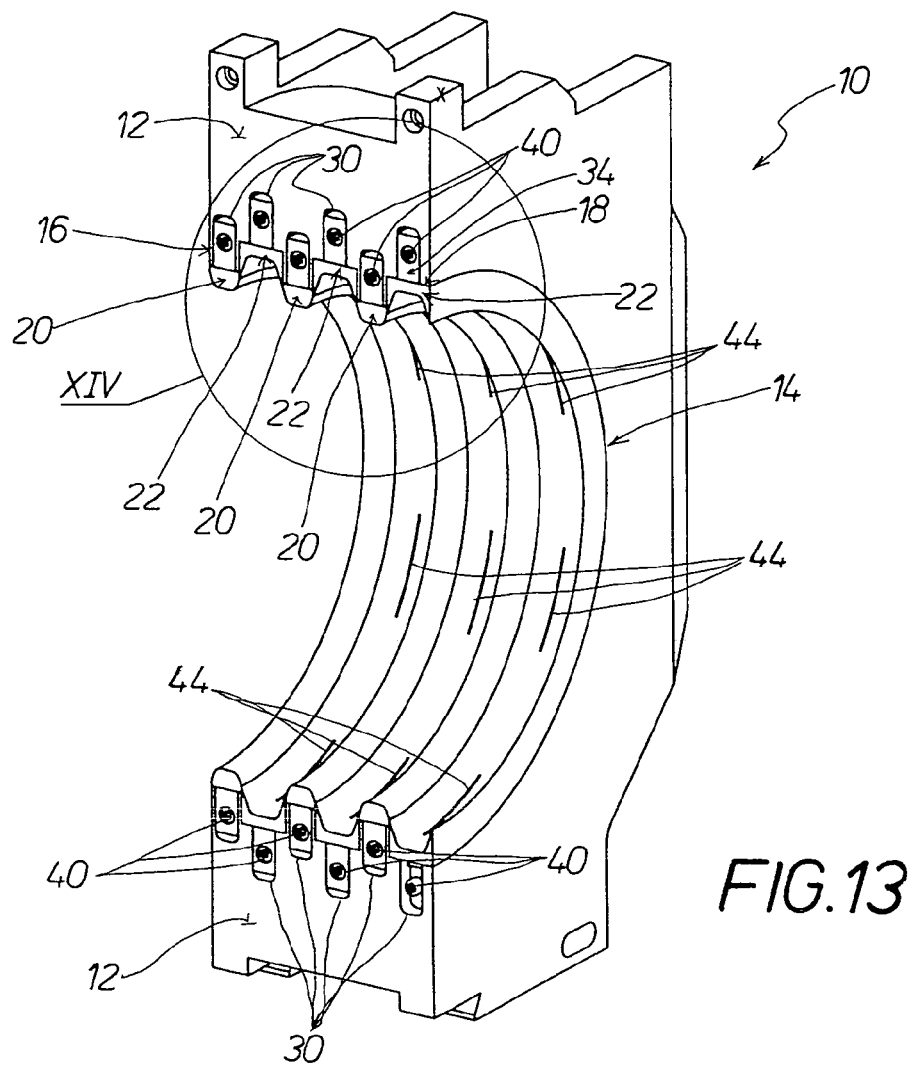
FIG. 13 shows a perspective view of a mold jaw half similar to that shown in FIG. 1, the molding insert elements having vacuum slots.
Figure 14:
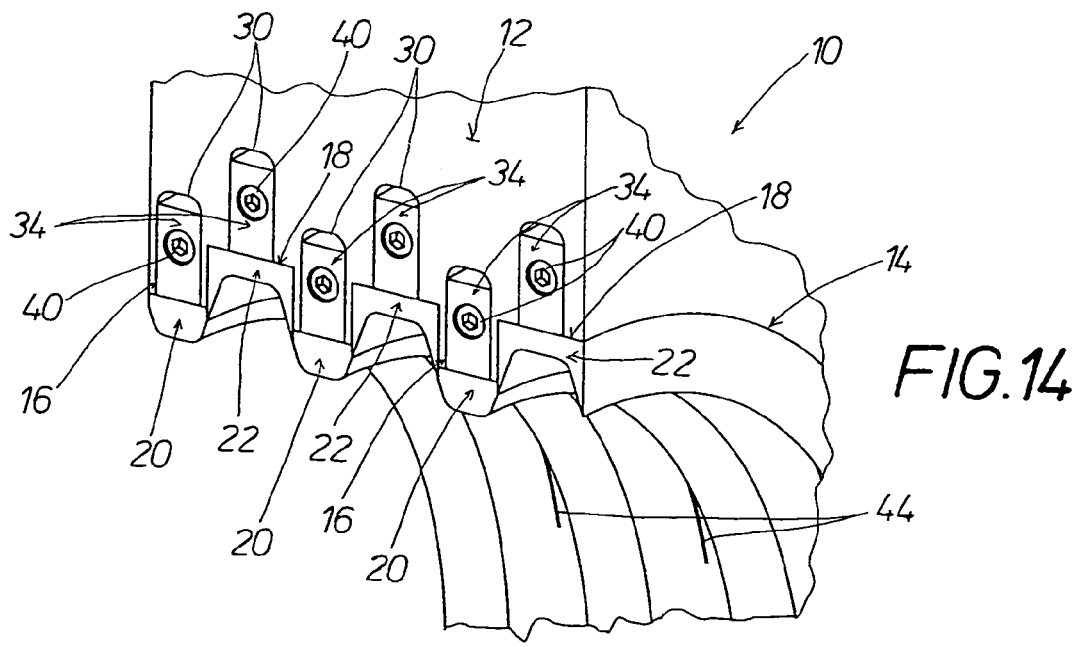
FIG. 14 shows a view of the detail XIV in FIG. 13 on a larger scale.

FIGS. 13 and 14 show a mold jaw half 10 which is of a similar configuration to the mold jaw half shown in FIG. 1, wherein the second molding insert elements 22 fixed in the channels 18 of the semicylindrical base surface 14 of the mold jaw half 10 have vacuum slots 44.

Identical features are denoted in FIGS. 13 and 14 by the same references as in FIGS. 1 through 12 so that there is no need for all features to be described in detail once again with reference to FIGS. 13 and 14.

FIG. 15 is an end view of a mold jaw half 10—similar to the embodiments of the mold jaw half 10 which are shown in FIGS. 8, 9, 10 and 11 and 12 respectively—wherein the semicylindrical base surface 14 is of a semicircular-cylindrical configuration with axially mutually spaced channels 58. As can be seen in particular from FIGS. 8 and 10, the securing members 48 provided at the rear side of the molding insert elements 60 are of a simple configuration of rectangular cross-section. The securing channels 50 are of a corresponding configuration with a rectangular internal cross-section so that it is easily possible, without involving a great deal of time, for the molding insert elements 60 not to have to be threaded into the mold jaw half 10 in the peripheral direction, but rather it is possible for the molding insert elements 60 to be easily fitted from the side into the mold jaw half 10. Thereafter the molding insert elements 60 are fixed by means of fixing elements 34 in the mold jaw half 10, using screws 40. The molding insert elements 60 have vacuum slots 44.

FIG. 16 shows a section taken along line XVI-XVI in FIG. 15 through the mold jaw half 10 and through a molding insert element 60 fixedly connected thereto and through the two fixing elements 34 fixing the corresponding molding insert element 60. FIG. 17 shows the detail XVII in FIG. 16. Identical features are also denoted in FIGS. 15 through 17 by the same reference numerals as in FIGS. 1 through 14.

FIG. 18 shows a mold jaw half 10 similar to that diagrammatically shown in FIG. 15, but in this case the molding insert elements 60 have vacuum slots 44 extending along the entire peripheral extent of the respective molding insert element 60, as can also be seen in particular from FIG. 20. The vacuum slots 44 are in flow communication with the vacuum passage system 46 which is provided in the mold jaw half 10 and which has already been mentioned hereinbefore. The vacuum passage system 46 has a first passage portion 72 which can be connected to a vacuum source (not shown) and which opens out of one of the end faces 12 of the mold jaw half 10 in order to communicate the associated molding jaw halves 10 with the vacuum source. The first passage portion 72 is in flow communication with at least one second passage portion 74 which opens out into the vacuum slots 44. If the vacuum slots 44 extend over the entire peripheral length of the respective molding insert element 60, then a single second passage portion 74 can be sufficient. If the molding insert elements 60—as shown for example in FIG. 15—have short and mutually spaced vacuum slots 44, it will be appreciated that it is then necessary for the respective vacuum slot groups to be associated with a respective associated second passage portion 74.

The Figures of the drawings show various configurations of the mold jaw half 10 with different molding insert elements for producing corresponding transversely ribbed tubes, in which respect it will be appreciated that the invention is not limited to the embodiments illustrated in the drawings but is defined by the claims.

The invention claimed is:

1. A molding jaw half for a corrugator for the production of transversely ribbed tubes, wherein the mold jaw half (10) has two mutually spaced end faces (12) arranged in a common plane and a semicylindrical base surface (14) which connects the two end faces (12) and to which there are releasably mounted molding insert elements (20, 22) which are in the shape of a semicircular arc and which determine the outside surface of the transversely ribbed tube and which each have two diametrically oppositely disposed molding element end faces (28) which are in planar alignment with the end faces (12) of the mold jaw half (10), wherein each of the two end faces (12) of the mold jaw half (10), adjoining the semicylindrical base surface (14), have a number of first recesses (30), which corresponds to the number of molding insert elements, and the two molding element end faces (28) of the respective molding insert element, adjoining the two end faces (12) of the mold jaw half (10), are each provided with a respective second recess (32), wherein a fixing element (34) extends between the respective first recess and the associated second recess for fixing the respective molding insert element to the mold jaw half (10), wherein the semicylindrical base surface (14) of the mold jaw half (10) is provided with crests (16) and channels (18) which alternate in the axial direction, wherein first molding insert elements (20) having a convex cross-sectional edge contour (24) are releasably mounted to the crests (16) and second molding insert elements (22) having a concave cross-sectional edge contour (26) are releasably mounted in the channels (18), wherein the convex cross-sectional edge contours (24) of the first molding elements (25) and the concave cross-sectional edge contours (26) of the second molding insert elements (22) are directly and immediately steplessly adjoining each other.

2. A mold jaw half as set forth in claim 1, wherein each molding insert element (20, 22) is provided at the rear side with a securing member (48) which is fitted into a securing channel, adapted thereto in respect of cross-section, in the semicylindrical base surface (14) of the mold jaw half (10).

3. A mold jaw half as set forth in claim 2, wherein the securing member (48) and the securing channel (50) adapted thereto in respect of shape are of a trapezoidal or of a rectangular cross-sectional profile.

4. A mold jaw half as set forth in one of claims 1 through 3, wherein the molding insert elements (22) are provided with vacuum slots (44) and the mold jaw half (10) is provided with a vacuum passage system (46).

5. A mold jaw half as set forth in claim 4, wherein the vacuum passage system (46) has at least one first passage portion (72) which opens out of one of the end faces (12) of the mold jaw half (10) and which is connectable to a vacuum source and at least one second passage portion (74) which is connected to the first passage portion and which opens out into the vacuum slots (44).

* * * * *